US007996592B2

(12) United States Patent
Kim et al.

(10) Patent No.: US 7,996,592 B2
(45) Date of Patent: Aug. 9, 2011

(54) CROSS BAR MULTIPATH RESOURCE CONTROLLER SYSTEM AND METHOD

(75) Inventors: Jason Seung-Min Kim, San Jose, CA (US); Robert Alan Bignell, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1149 days.

(21) Appl. No.: 09/847,991

(22) Filed: May 2, 2001

(65) Prior Publication Data
US 2002/0166017 A1 Nov. 7, 2002

(51) Int. Cl.
G06F 12/00 (2006.01)
G06F 13/00 (2006.01)
(52) U.S. Cl. .................... 710/244; 710/317
(58) Field of Classification Search .......... 710/316, 710/317, 240–244; 711/141, 143, 153
See application file for complete search history.

(56) References Cited

U.S. PATENT DOCUMENTS

| | | | | |
|---|---|---|---|---|
| 3,805,247 A * | 4/1974 | Zucker et al. | ............... | 712/225 |
| 4,080,649 A * | 3/1978 | Calle et al. | ............... | 710/48 |
| 4,125,877 A * | 11/1978 | Reinert | ............... | 365/190 |
| 4,438,494 A * | 3/1984 | Budde et al. | ............... | 714/2 |
| 4,594,657 A * | 6/1986 | Byrns | ............... | 710/241 |
| 5,053,942 A * | 10/1991 | Srini | ............... | 710/317 |
| 5,081,575 A * | 1/1992 | Hiller et al. | ............... | 710/317 |
| 5,179,669 A * | 1/1993 | Peters | ............... | 710/317 |
| 5,182,801 A * | 1/1993 | Asfour | ............... | 709/214 |
| 5,327,548 A * | 7/1994 | Hardell et al. | ............... | 711/147 |
| 5,394,551 A * | 2/1995 | Holt et al. | ............... | 710/200 |
| 5,463,486 A | 10/1995 | Stevens | ............... | 359/117 |
| 5,590,304 A * | 12/1996 | Adkisson | ............... | 711/100 |
| 5,680,577 A * | 10/1997 | Aden et al. | ............... | 711/150 |
| 5,689,713 A * | 11/1997 | Normoyle et al. | ............... | 710/263 |
| 5,784,394 A * | 7/1998 | Alvarez et al. | ............... | 714/800 |
| 5,787,889 A | 8/1998 | Edwards et al. | ............... | 128/660.07 |
| 5,805,030 A * | 9/1998 | Dhuey et al. | ............... | 333/1 |
| 5,920,714 A | 7/1999 | Schiffleger | ............... | 395/588 |
| 5,949,982 A * | 9/1999 | Frankeny et al. | ............... | 710/317 |
| 5,951,638 A | 9/1999 | Hoss et al. | ............... | 709/206 |
| 5,968,153 A | 10/1999 | Wheeler et al. | ............... | 710/110 |
| 6,009,389 A | 12/1999 | Dokic et al. | ............... | 704/228 |
| 6,035,414 A * | 3/2000 | Okazawa et al. | ............... | 714/7 |
| 6,070,003 A | 5/2000 | Gove et al. | ............... | 395/312 |
| 6,125,429 A * | 9/2000 | Goodwin et al. | ............... | 711/143 |
| 6,145,007 A | 11/2000 | Dokic et al. | ............... | 709/230 |
| 6,167,489 A * | 12/2000 | Bauman et al. | ............... | 711/145 |

(Continued)

FOREIGN PATENT DOCUMENTS

EP 380851 A2 * 8/1990

(Continued)

OTHER PUBLICATIONS

Microsoft Press Computer Dictionary second edition 1994 pp. 317 and 354.*

(Continued)

Primary Examiner — Paul R Myers

(57) ABSTRACT

A cross bar multipath resource controller system and method permit multiple processors in a computer system to access various resource of the computer system, such as memory or peripherals, with zero blocking access. In particular, each processor has its own bus so that the processors can each independently access different resources in the computer system simultaneously.

24 Claims, 7 Drawing Sheets

FUNCTIONAL BLOCK DIAGRAM OF SDMI-SOC

U.S. PATENT DOCUMENTS

| | | | |
|---|---|---|---|
| 6,173,356 B1 * | 1/2001 | Rao | 711/5 |
| 6,188,381 B1 | 2/2001 | Van Der Wal et al. | 345/112 |
| 6,247,100 B1 * | 6/2001 | Drehmel et al. | 711/141 |
| 6,295,571 B1 | 9/2001 | Scardamalia et al. | 710/129 |
| 6,456,628 B1 | 9/2002 | Greim et al. | 370/466 |
| 6,480,941 B1 * | 11/2002 | Franke et al. | 711/153 |
| 6,594,752 B1 * | 7/2003 | Baxter | 712/43 |
| 6,636,933 B1 * | 10/2003 | MacLellan et al. | 710/317 |
| 6,678,801 B1 | 1/2004 | Greim et al. | 711/148 |
| 6,922,771 B2 | 7/2005 | Kim et al. | |
| 6,938,253 B2 | 8/2005 | Kim | |
| 7,248,597 B2 | 7/2007 | Kim | |
| 7,492,131 B2 | 2/2009 | Kim | |

FOREIGN PATENT DOCUMENTS

| | | | |
|---|---|---|---|
| EP | 543560 A2 * | 5/1993 | |
| EP | 953903 A2 * | 11/1999 | |

OTHER PUBLICATIONS

Structured Computer Organization third edition, Andrew S. Tanenbaum 1990 pp. 11-13.*
Microsoft Press Computer Dictionary Third Edition Definition of Samaphore.*
Microsoft press computer dictionary 1997 definition of multiplexer.*
PCT International Search Report dated Jul. 18, 2002.

* cited by examiner

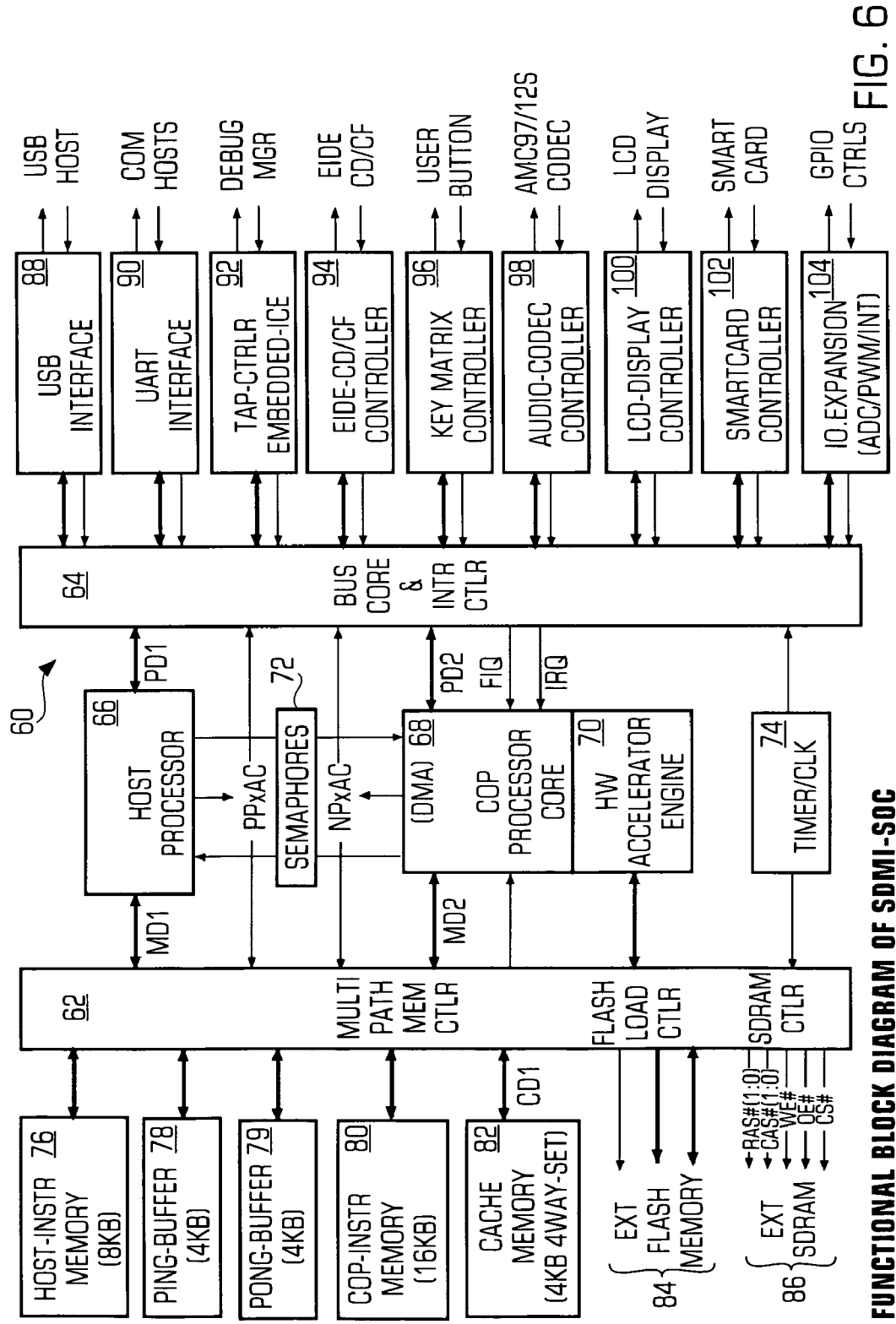
FIG. 6 FUNCTIONAL BLOCK DIAGRAM OF SDMI-SOC

CROSS BAR MULTIPATH RESOURCE CONTROLLER SYSTEM AND METHOD

BACKGROUND OF THE INVENTION

This invention relates generally to a system and method for managing access to common resources in a multiprocessor system wherein it is desirable to provide the fastest access by the processors to the common resources.

When a particular application/project/job requires more processing power than a single processor is capable of providing, it becomes necessary to provide a coprocessor, such as a digital signal processor (DSP) or a floating point unit (FPU). Thus, the tasks associated with the particular application are handled in unison by the main processor and the coprocessor. The most common conventional solution to solving the problem of how to allocate the resources to the multiple processors is to utilize a dual-ported memory subsystem wherein each processor has equal access to the common resources that may be used by both processors. Alternatively, each processor may be provided with a dedicated resource and a mechanism for transferring commands and data through a shared "Mail Box". The shared "Mail Box" typically includes a number of first in first out (FIFO) registers of various lengths.

The conventional dual-ported memory solution provides processor independent design implementation, but requires a large amount of hardware for the random access arbitration for both processors. Consequently, the actual implementation of the arbitration logic and the random access for the common bus creates more delay on the common resources since the access to the common bus must be determined prior to accessing the common resources. The typically small degradation in the access speed in the dual-ported memory gets magnified by a significant amount when that common resource is the main memory because the main memory is the common resource most utilized by both processors. Therefore, the interdependency of the multiple processors increases since they both rely heavily on the main memory.

The conventional dedicated resource for each processor with the shared "Mail Box" scheme prevents the multiple processors from competing with each other for the same resource, but suffers greatly in terms of access speed since the data and commands must all pass through the "Mail Box" which has a relatively narrow throughput. In addition, duplicative resources are necessary since each processor has its own dedicated resources. Although the scheme works quite well when the tasks for the processors are well defined and common data transfer is relatively small, the actual performance and resource utilization suffers greatly when the tasks are not well defined and the processors are therefore more interdependent.

In another conventional system for sharing common memory between one or more processors, the memory has gate logic associated with each processor and each bit in the memory has two access points (e.g., one access point for the first processor and one access point for the second processor for a two processor system). In this configuration, the contention between the processor is reduced since each processor has its own access to each bit of memory. The drawback with this approach is that there is large amount of duplicated logic, including the read and write logic, to control the accesses by each processor. In addition, each memory cell is more complex than a typical memory cell. In particular, a typical DRAM memory cell has a single transistor and a capacitor whereas the memory cell for the dual access port memory has four transistors for each cell since each cell may be accessed independently by the first or second processor.

Thus, it is desirable to provide a cross bar multipath resource controller that overcomes the above limitations and problems with conventional multiprocessor resource management solutions and it is to this end that the present invention is directed.

SUMMARY OF THE INVENTION

The cross bar multipath resource controller system in accordance with the invention overcomes the problem and limitation with conventional multiprocessor resource allocation solutions to provide the highest performance (e.g., the fastest access speed for each processor to the common resources) with a minimum number of resources. The cross bar multipath system in accordance with the invention uses a cooperative resource management system between the multiple processors. In particular, all of the resources for both processors are connected to a shared cross bar bus and then each processor may negotiate for a priority access to the preferred locations in the resource through the use of hardware "Semaphores" in a preferred embodiment of the invention.

In more detail, each processor releases the priority access privileges (in a cooperative manner) to any resources that are no longer needed by the processor so that the other processor may have priority access when needed. Consequently, when a large block of data needs to be transferred from one processor to the other processor, the processor that is transferring the block of data may release the priority access and let the other processor retrieve the data at the priority access rates. When a processor has the priority access to a particular memory, for example, the bus arbiter shorts the connection from the processor to the particular memory for normal operation so that no switching is required for the primary processor. When the secondary processor tries to access the same resource, the secondary processor would always wait for the idle time. Therefore, the cross bar multipath system in accordance with the invention works well for well orchestrated multi-processor applications especially with embedded systems with common operating systems.

Thus, in accordance with the invention, a computer system having a multipath cross bar bus is provided wherein the computer system has one or more processors and one or more resources capable of being shared by the one or more processors. The system further comprises a resource controller and bus that is connected to each resource and to each processor wherein the resource controller is capable of permitting each processor to simultaneously access a different resource from the one or more resources.

In accordance with another aspect of the invention, an apparatus for controlling the access to one or more computing resources by one or more processor is provided wherein the apparatus comprises a resource controller and bus that is connected to each resource and to each processor wherein the resource controller is capable of permitting each processor to simultaneously access a different resource from the one or more resources. In accordance with yet another aspect of the invention an apparatus for controlling the access to one or more memory resources by one or more processors is provided wherein the controller comprising a memory resource controller and bus that is connected to each memory resource and to each processor so wherein the memory resource controller is capable of permitting each processor to simultaneously access a different resource from the one or more memory resources. In accordance with yet another aspect of the invention, an apparatus for controlling access by one or more processors to one or more peripheral resources is provided wherein the apparatus comprises a peripheral resource controller and bus that is connected to each peripheral resource and to each processor so wherein the resource controller is capable of permitting each processor to simultaneously access a different peripheral resource from the one or more peripheral resources.

BRIEF DESCRIPTION OF THE DRAWINGS

FIG. 6 is a block diagram illustrating a preferred embodiment of a multi-processor system including the cross bar multipath resource controller in accordance with the invention that includes a cross bar multipath memory controller and a cross bar multipath peripheral bus;

DETAILED DESCRIPTION OF A PREFERRED EMBODIMENT

The invention is particularly applicable to a portable music system employing the secure digital music initiative (SDMI) having multiple processors and it is in this context that the invention will be described. It will be appreciated, however, that the cross bar multipath resource bus and method in accordance with the invention has greater utility, such as to any other systems that use multiple processors. To better understand the invention, an example of a typical multiprocessor system will now be described so that the limitations of such a typical systems will be more readily apparent.

Figure 1:
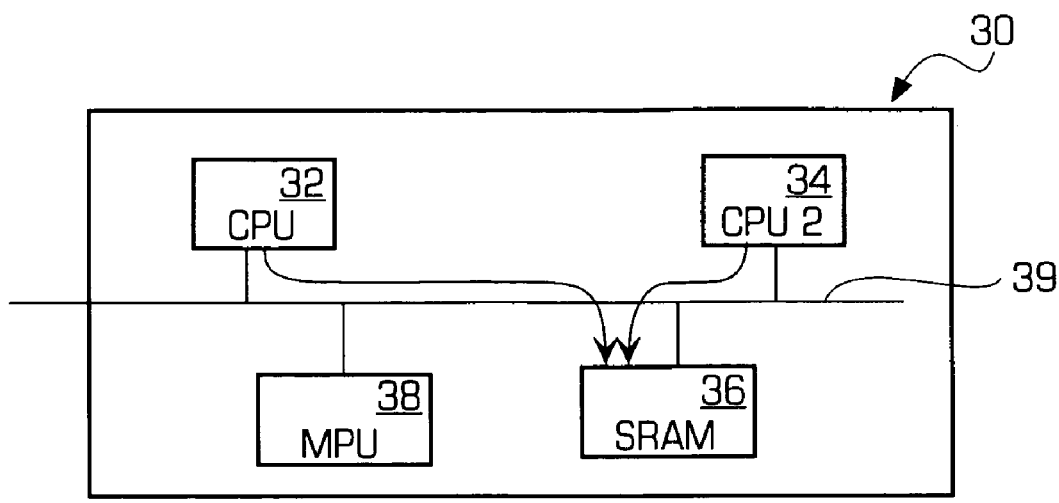
FIG. 1 illustrates a typical multi-processor architecture.

FIG. 1 illustrates a typical multi-processor architecture 30 wherein a first processor 32 (CPU) and a second processor 34 (CPU2) must share the resources of the system including a static random access memory (SRAM) 36 and a math coprocessing unit (MPU) 38. In the typical system, the two processors must each access the SRAM using a single bus 39 at some point to either read data or write data. In this architecture, when the first processor is accessing the SRAM 36 using the bus 39, the second processor cannot access the SRAM at all and must wait for the completion of the memory access by the first processor. Similarly, when the second processor accesses the memory, the first processor must wait for access to the memory. This architecture therefore causes both processors to be inefficient since both cannot operate a full speed since both, during certain periods of time, have to wait for access to a shared resource. This architecture therefore effectively limits the advantages provided by the multi-processor architecture. Other conventional architectures such as embedded SRAMs or a dual port memory, as described above, attempt to solve the above problem, but typically introduce other unacceptable limitations and drawbacks. The cross bar multipath resource controller in accordance with the invention as will now be described, overcomes the limitations and drawbacks with the conventional architectures and balances the need for processor speed with the desire to limit the duplication of hardware.

Figure 2:
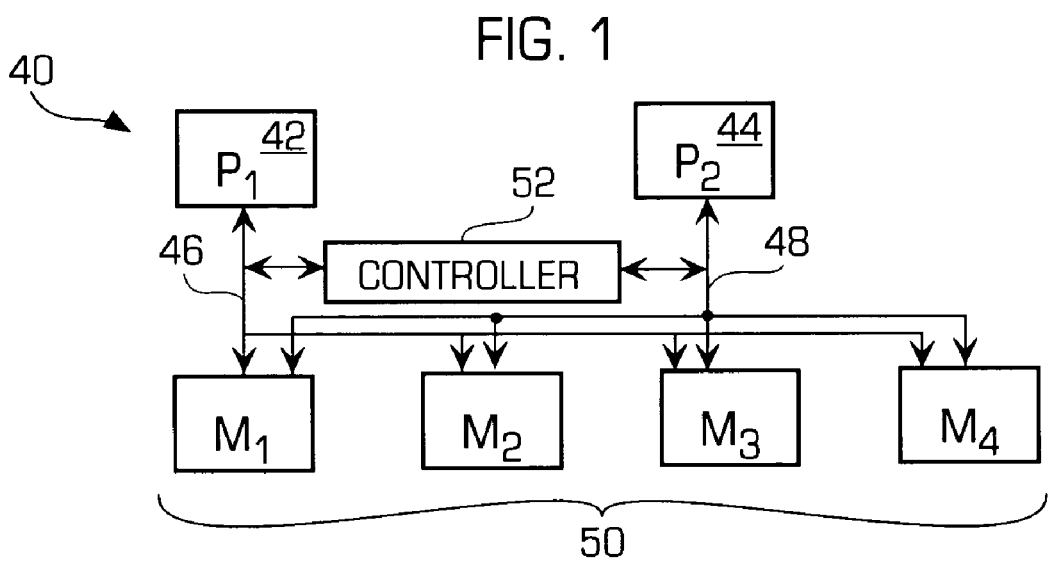
FIG. 2 illustrates a cross bar multi-processor architecture in accordance with the invention.
Figure 3:
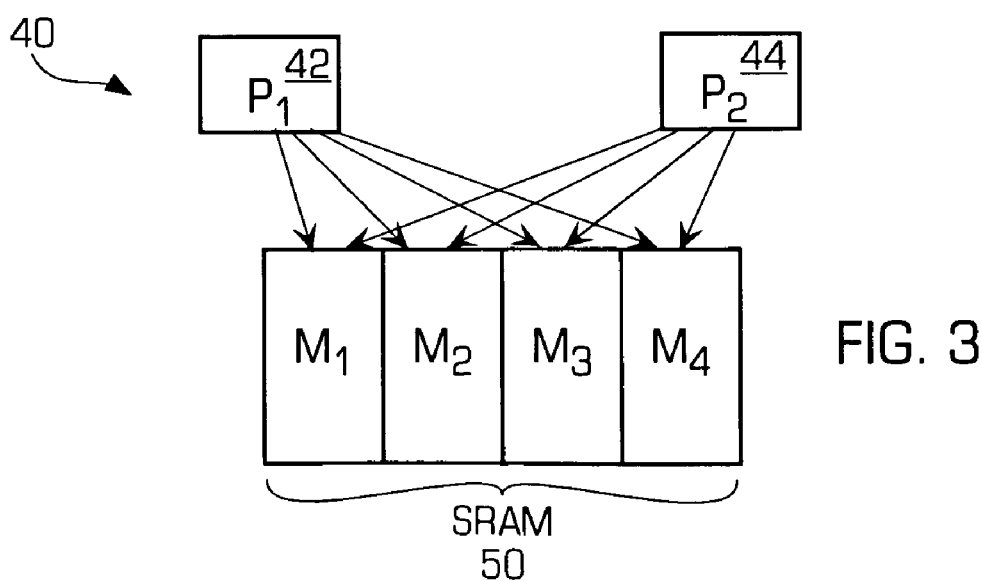
FIG. 3 is a logical diagram illustrating the cross bar architecture of FIG. 2.

FIG. 2 illustrates an example of a cross bar multi-processor architecture 40 in accordance with the invention. In this example of the cross bar architecture 40, a two processor system is shown although the cross bar architecture may be used with any number of processors. The system may include a first processor 42 ($P_1$) and a second processor 44 ($P_2$) that may share the processing load for tasks being completed by the system as is well known for multi-processor systems. The system may further include a first bus 46 connected to the first processor 42 and a second bus 48 connected to the second processor 44. In this example, the processors are connected by the buses to a common memory 50 although the cross bar architecture may be used to connect two or more processors to a variety of different shared resources and is not limited to the sharing of a memory. In accordance with the invention, the memory 50 (or whatever other resource is being shared by the processors) is divided into one or more portions (memory portions $M_1$-$M_4$ in this example) wherein the bus for each processor is connected to each portion of the shared resource as shown. Thus, the first bus 46 and the second bus 48 are both independently connected to each portion of the resource so that each processor may independently access each portion of the memory at different times. To control the access to each resource portion, the system may include a controller 52 that will be described in more detail below. FIG. 3 is a logical diagram illustrating the cross bar architecture 40 of FIG. 2 wherein the first and second processors 42, 44 each may independently access a portion of the resource 50.

In accordance with the invention, the first processor may access a first portion of the resource while the second processor may simultaneously access a second portion of the memory thereby keeping both processors working at full speed. If the two processors are working cooperatively and need to share data during a task, the first processor may access the first portion of the memory during a first portion of the task and complete that portion of the task and then the access to the first portion of the memory may be immediately handed off to the second processor which may then access the data in the first memory portion. This scheme reduces the latency in the system since each processor may access data when needed provided that the instructions are generated in such a way as to encourage the sharing of the resource. Now, an example of a task being shared by the two processors shown in FIG. 2 at different times, $T_0$-$T_4$ will be described to provide a better understanding of the invention.

Figure 4:
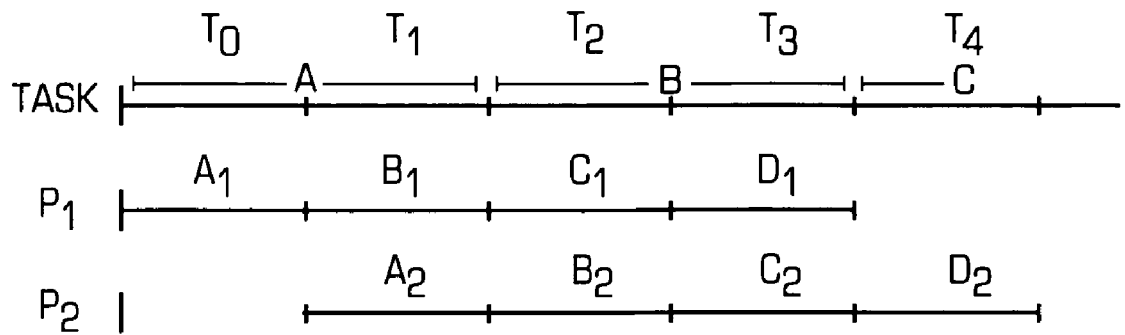
FIG. 4 illustrates an example of two multi-processor tasks at different times, $T_0$-$T_4$, wherein the tasks are divided between two different processors.
Figure 5A:
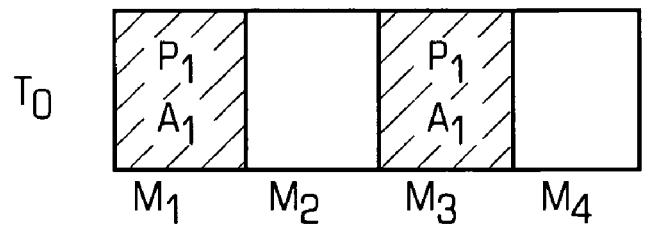
FIGS. 5A-5E are diagrams illustrating the memory portions, $M_1$-$M_4$, at the different times, $T_0$-$T_4$, for the two tasks in FIG. 4.
Figure 5B:
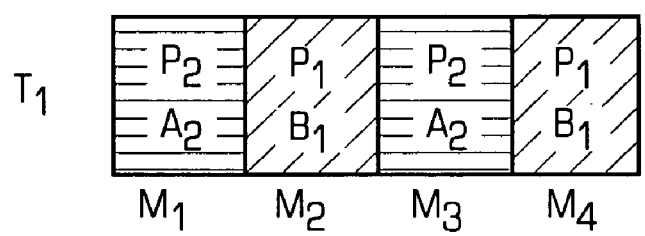
Figure 5C:
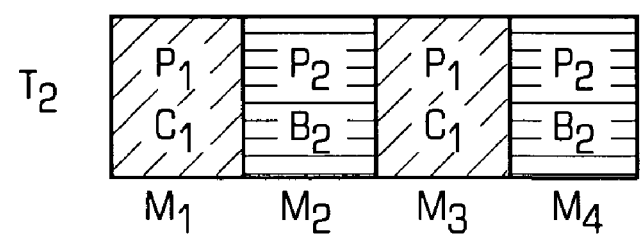
Figure 5D:
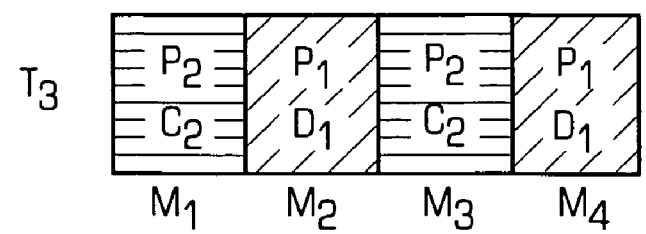
Figure 5E:
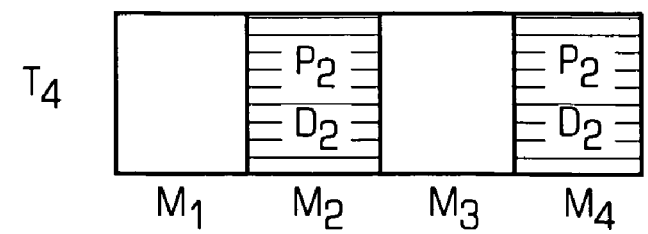

FIG. 4 illustrates an example of four multi-processor tasks (A, B, C and D) at different times, $T_0$-$T_4$, wherein the tasks are divided between two different processors and FIGS. 5A-5E are diagrams illustrating the memory portions, $M_1$-$M_4$, at the different times, $T_0$-$T_4$, for the four tasks in FIG. 4. In particular, the executable code for the multiprocessor system is written in such a way as to take advantage of the multi-processors and their processing capacity. In the example, four tasks (A, B, C and D) are shown. In particular, the four tasks have been split between the two processors wherein the first processor, $P_1$, performs the first part of each task and the second processor, $P_2$, performs the second part of each task as shown. Then, while the second processor is completing the second part of the task, the first processor uses another portion of the resource to begin a next task. As shown in FIG. 5A, at time $T_0$, the first and third memory resources (e.g., the instruction memory and the ping buffer) are currently being accessed by the first processor that is performing the first part of the first task ($A_1$). At time $T_1$ (as shown in FIG. 5B), the first processor starts the first part of the second task ($B_1$) and accesses the second and fourth memory resources ($M_2$ and $M_4$) while the second processor starts and completes the second portion of the first task ($A_2$) using the first and third memory resources ($M_1$ and $M_3$) that were previously used by the first processor. The access is granted to the first and second processors by the controller shown in FIG. 2. At time $T_2$ as shown in FIG. 5C, the first processor has completed its part of the second task and has started the first portion of a third tasks ($C_1$) using the first and third memory resources while the second processor performs the second part of the second task ($B_2$) using the second and fourth memory resources. As shown in FIG. 5D, while the second processor is working on the second portion of the third task ($C_2$), the first processor requests and is granted access to the second and fourth memory resources so that the first processor can begin the first portion of another task ($D_1$). At time $T_4$ (as shown in FIG. 5E), the first processor has completed its tasks and is not accessing any of the memory resources while the second processor is completing the second part of the fourth task ($D_2$) using the second and fourth memory resources. In this manner, the tasks may be split between the processors and take advantage of the independent processing power of each processor. It may also take advantage of the two processors being able to work cooperatively as shown in FIG. 4 with a minimum amount of latency. To accomplish the cooperative work, the tasks are apportioned between the two processors to take advantage of the dual processor system. Now, a preferred embodiment of the multi-processor system with the crossbar resource controller in accordance with the invention will be described.

FIG. 6 is a block diagram illustrating a preferred embodiment of a multi-processor system 60 including the cross bar multipath resource controller in accordance with the invention that includes a cross bar multipath memory controller 62 and a cross bar multipath peripheral controller 64. The details of the cross bar multipath memory controller 62 is described below with reference to FIGS. 7 and 8 and details of the cross bar peripheral controller 64 is described below with reference to FIGS. 9 and 10. As shown, the system 60 may include a host processor 66 which may preferably be a reduced instruction set (RISC) ARM core made by ARM Inc and a coprocessor core 68 that operate in a cooperative manner to complete tasks as described above. In the preferred embodiment, there may also be a hardware accelerator engine 70 as shown. The host processor, the coprocessor and the hardware accelerator engine are all connected to the multipath memory controller 62 and the multipath peripheral controller 64 as shown. To control access to the shared resources connected to the multipath memory controller and the multipath peripheral controller, the system 60 may include a semaphore unit 72 which permits the two processors 66, 68 to communicate with each other and control the access to the shared resources. The semaphore unit permits the processors to negotiate for the access to the shared resources as described above, but then, due to the multipath controllers 62, 64, permits the processors to access the resources over its own bus that is part of the controllers. To control the timing of the controllers 62, 64, a timer/clock 74 is connected to each controller 62, 64.

Both the memory controller 62 and the peripheral controller 64 are then in turn connected to one or more resources that are shared by the processors. For example, the memory controller 62 in this preferred embodiment is connected to a host instruction memory 76 that is typically accessed by the host processor 66, a ping buffer 78 is a general purpose memory resource that may be accessed by each processor, a pong buffer 79 is a general purpose memory resource that may be accessed by each processor and a coprocessor instruction memory 80 which is typically accessed by the coprocessor 68. Due to a priority scheme and the cross bar architecture, the host processor may always have priority access to its instruction memory 76 and the coprocessor may always have priority access to its instruction memory 80 since the two processors each have separate buses connected to each resource. The memory controller 62 may also be connected to a cache memory 82, which is a well known 4-way 4 kB set associative cache in the preferred embodiment, a flash memory interface 84 for connecting to an external flash memory and an external synchronous dynamic random access memory (SDRAM) interface 86 with the various necessary signals, such as RAS, CAS, WE, OE and CS, to interface to a typical well known SDRAM.

The peripheral multipath controller, which operates in a similar manner to the memory controller in that each processor may access different shared resources simultaneously, may have one or more peripherals connected to it. In the preferred embodiment, the peripheral controller may be connected to a universal serial bus (USB) interface 88 that in turn connects to a USB device or host, a universal asynchronous receiver/transmitter (UART) interface 90 that in turn connects to communication port (COM) hosts, a TAP/embedded ICE controller 92, an EIDE-CD/CF controller 94 to interface to hard disk drives or CD drives, a key matrix controller 96 that connects to a user input keyboard, an audio-codec controller 98 that connects to an audio coder/decoder (codec), an liquid crystal display (LCD) display controller 100 that connects to a LCD display, a smartcard controller 102 for connecting to a well known smart card and an input/output (I/O) expansion port 104 that connects to one or more different input/output devices. As with the memory controller, the peripheral controller provides access for each processor to each shared resource. Now, more details of the cross bar multipath memory controller in accordance with the invention will be described.

Figure 7:
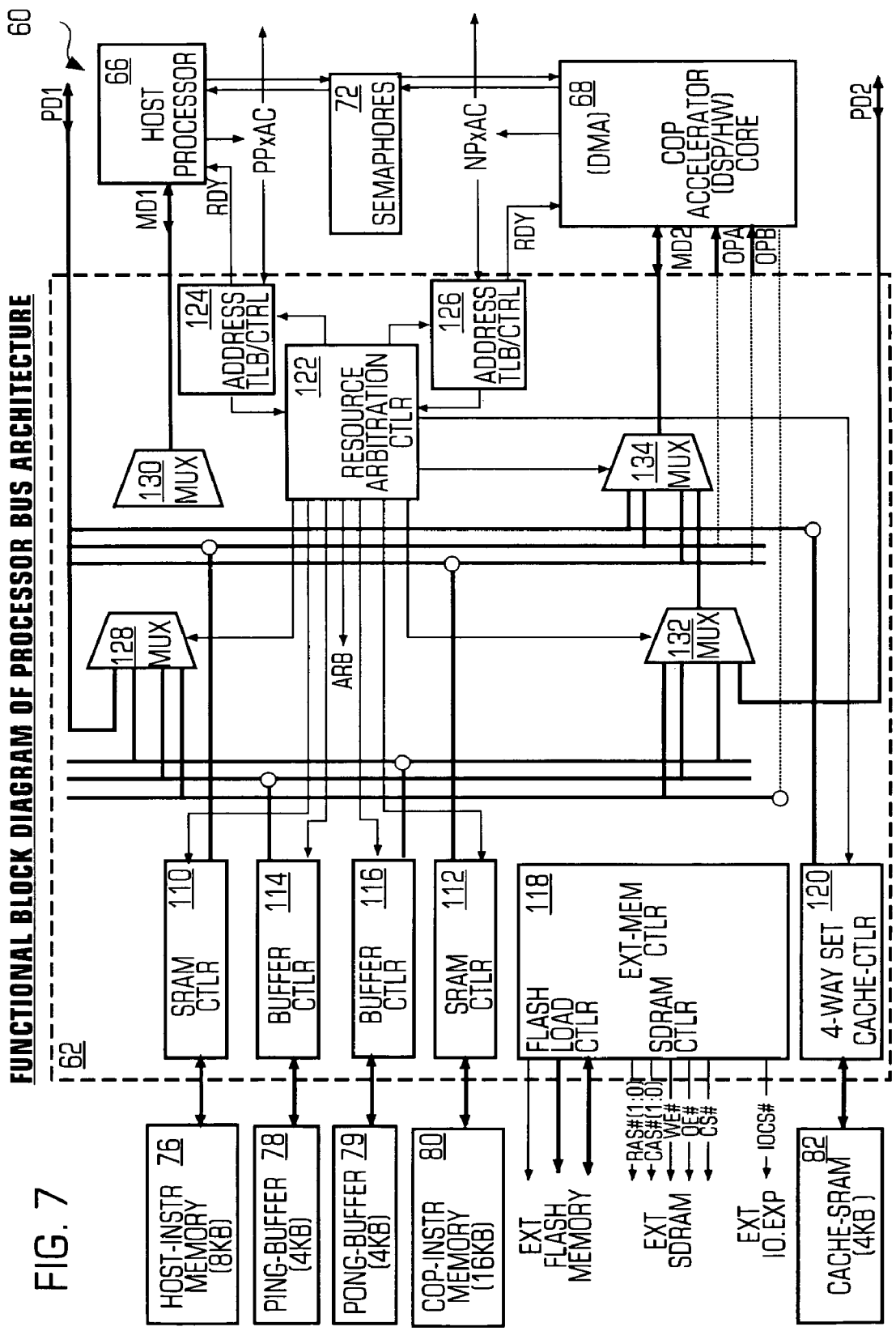
FIG. 7 is a block diagram illustrating more details of the cross bar multipath memory controller in accordance with the invention.

FIG. 7 is a block diagram illustrating more details of the cross bar multipath memory controller 62 in accordance with the invention wherein some other elements of the system, such as the host processor 66, the coprocessor 68 and the semaphore unit 72 are also shown connected to the memory controller. In addition, the buffers and memories 76-82 connected to the memory controller 62 are shown. The memory controller may include one or more controllers to control the resources connected to the memory controller. In the preferred embodiment shown, the memory controller may include a first and second SRAM controller 110, 112 that control the instruction memories 76, 80 and a first and second buffer controller 114, 116 that control the ping buffer 78 and the pong buffer 79, respectively. The memory controller may also include an external memory controller 118 and a cache controller 120. The semaphore unit 72 permits communications of the resource allocations between the processors.

To control the access to each shared resource, the memory controller may include a resource arbitration controller 122 that is connected to a first address controller 124 that is in turn connected to the first processor 66 and a second address controller 126 that is connected to the coprocessor 68. The address controllers and known as translate and look aside buffers which are well known. The resource arbitration controller may be connected to each resource controller 110-120 to control the operation of the memory resources. To control access by each processor to the various memory resources, the resource arbitration controller 122 may also be connected to a first multiplexer (MUX) 128, a second MUX 130, a third MUX 132 and a fourth MUX 134 and control the operation of those MUXes as described below. In this embodiment, the first and second MUXes 128, 130 are also connected to the host processor 66 to provide it with data from the one or more resources (including memory resources and peripheral resources) over a memory data line, MD1 and the third and fourth MUXes 132, 134 are also connected to the coprocessor 68 to provide it with data from the one or more resources (including memory resources and peripheral resources) over a memory data line, MD2. As shown, each processor has its own memory data bus so that each can be accessing a different resource simultaneously. The first and second MUXes 128, 130 multiplex the buses from the different memory resources and the different peripheral resources over a peripheral data bus (PD1) and select one onto the single MD1 bus while the third and fourth MUXes 132, 134 multiplex the buses from the different memory resources and the different peripheral resources over a peripheral data bus (PD2) into the single MD2 bus. The first and third MUXes 128, 132 also multiplex peripheral data from a peripheral data bus (PD1 or PD2 depending on whether it is connected to the host processor or the coprocessor) into the memory data bus as needed.

In the embodiment shown, the first MUX 128 has a peripheral data bus PD1 input, a pong buffer input, a ping buffer input and a bus connected to the coprocessor 68. As shown, the MUXes select one of these input, under control of the resource arbitration controller 122 as shown by the "00", "01", "10" and "11" notations next to each input of the MUX. Similarly, the second MUX 130 has an input which in the output of the first MUX, an input from the coprocessor instruction memory 80, an input from the host processor instruction memory 76 and an input from the cache 82. Thus, using the two MUXes 128, 130 in this preferred embodiment, seven different buses from seven different memory resources and peripheral resources may be directly accessed by each processor under the control of the memory controller. It should be noted, however, that each processor has a direct link to each memory resource and peripheral resource so that, for example, one processor may access its instruction memory while the other processor simultaneously accesses its own instruction memory. In accordance with the invention, if there are more memory resources, additional cascaded MUXes may be provided as is well known. Thus, for example, three MUXes may be used to select one signal from 10 different resources, four MUXes may be used to select one signal from 13 different resources and so on. As with the first MUX 128, the second MUX 130 is also controlled by the resource arbitration controller 122 as shown by the logic notations next to each input of the MUX.

Similarly, the third and fourth MUXes 132, 134 connect the seven lines from each memory resource and peripheral resource to the coprocessor wherein the MUXes select one signal based on control signals from the resource arbitration controller 122 as described above. The resource arbitration controller 122 may be, for example, a microcontroller device running a piece of software code/instructions or hard coded instructions wherein it may generate the appropriate controls for the MUXes 128-134 based on data from the semaphore unit 72 and the address controllers 124, 126.

In operation, based on the instructions being executed by the processors as indicated by the semaphore unit 72 and data being received by the address controllers 124, 126, the resource arbitration controller may grant access to a particular memory or peripheral resource to a particular processor and then control the one or more appropriate MUXes to connect the requested resource to the particular processor. For example, if the host processor 66 requests access to the host processor instruction memory 76, the resource arbitration controller 122 grants it access since the host processor has priority access as described above. The controller 122 may then send a message to the SRAM controller 110 indicating that it is going to be accessed by the host processor. The controller 122 may then (or simultaneously) send a "01" data string to the second MUX 130 to program it to pass the signal from the instruction memory bus through to the memory data bus MD1 so that the host processor can access the instruction memory. When the host processor has completed its access, it may release the bus so that, for example, the coprocessor could in fact access the instruction memory for the host processor in a similar manner.

The architecture shown allows priority access to shared memory resources through the hardware semaphores generated by the semaphore unit 72 as will now be described. Now, the operation of the memory controller will be described in more detail with reference to FIG. 8.

Figure 8:
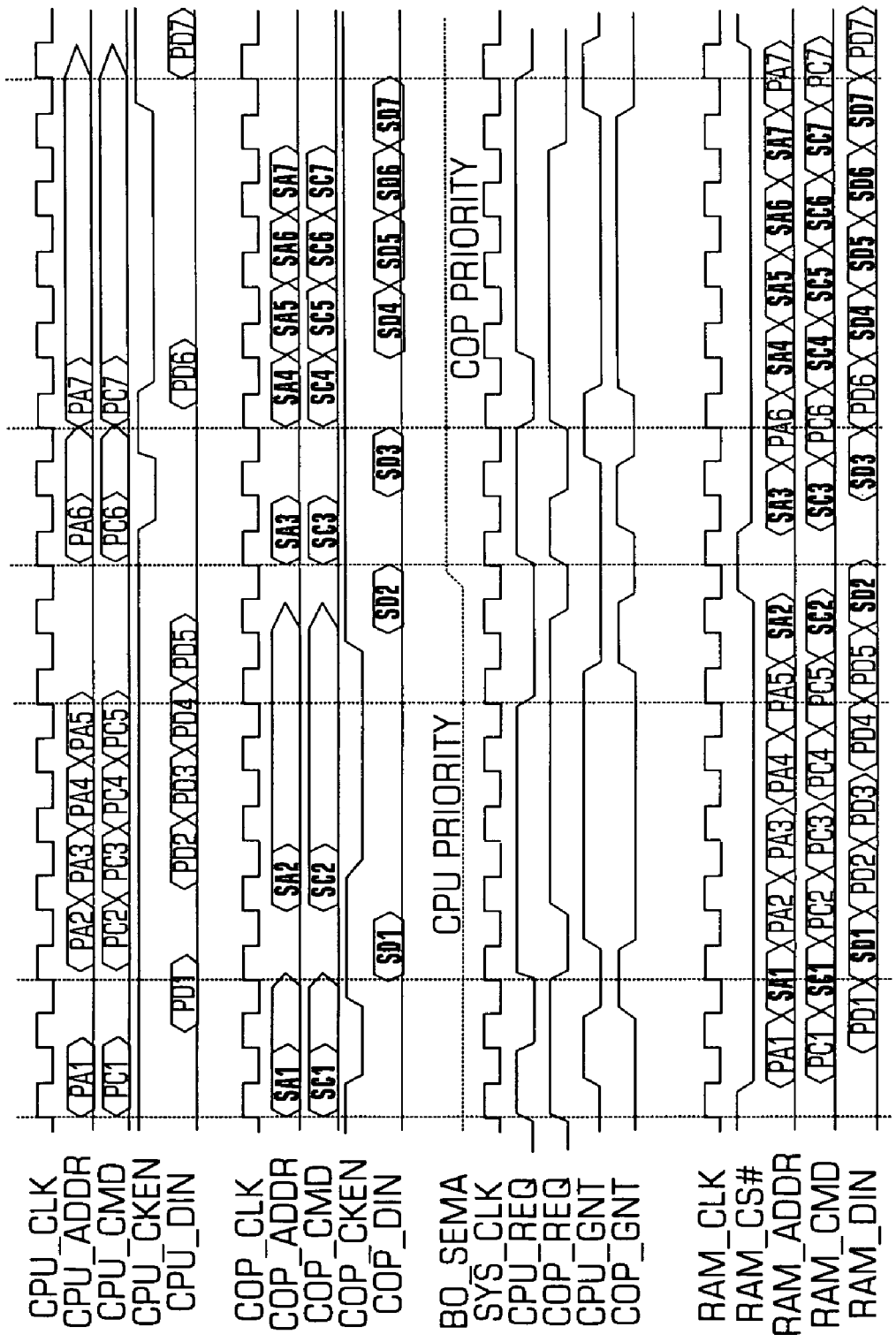
FIG. 8 illustrates the bus access timing of the cross bar multipath memory controller of FIG. 7.

FIG. 8 illustrates the bus access timing of the cross bar multipath memory controller of FIG. 7. In the preferred embodiment, each processor may be assigned a priority status at different times based on a bit of a semaphore from the semaphore unit so that the processor that has been given the priority is always able to access the particular shared resource while the non-priority processor must wait to access the shared resource. Provided that the instructions being executed by the processors is appropriately constructed, the priority scheme set by the semaphores may track those instructions so that the non-priority processor is less likely to need a shared resource during the time that it does not have priority access. The processor with priority access has "zero-wait" access in that it can access a shared resource at any time.

The timing diagram in FIG. 8 depicts the worst case condition where the host processor 66 and the secondary processor (COP) 68 are accessing a common resource block (RAM0). During normal operation when the processors are not both requesting the same shared resource, each processor can simultaneously access the resource due to the multipath controllers. In the preferred embodiment, depending on the state of the Arbitration Priority Semaphore bit (B0-SEMA) as shown in the timing diagram, the access latency is modified for each processor. In the example shown in the diagram, the first half of the timing diagram shows when host processor 66 has the priority for the SRAM0 resource while the second half of the timing diagram shows when COP 68 has the priority for accessing the SRAM1 memory block. As can be seen from the timing diagram, each processor, when it has priority, gets the "zero-wait" cycle accesses from it's privileged resources while the non-priority processor gets the "one-or-more-wait" cycle accesses for it's non-priority resources. In accordance with the invention, a processor may have priority to all of the resources during a period of time and then the other processor may have priority. Also in accordance with the invention, certain resources may be priority resources for one processor at all times, such as the host processor instruction memory resource for the host processor, while the other processor may have priority access at all times to other resources, such as the coprocessor instruction memory for the coprocessor. Alternatively, there may be some resources which are always a priority resource for a particular processor and other resources which are a priority resource for different processors at different times.

Returning to the diagram, it should be noted that the non-priori processor (e.g., the processor that does not currently have priority access to the particular shared resource) will wait indefinitely for the next free cycles when consecutive access are made from the privileged processor. Fortunately, this would not be a valid situation, since the arbitration is based on the availability of each resource blocks (RAM) instead of the processor requests. Considering that each processor must fetch instruction and then request data, our Zero-Wait cycle internal Ping-Pong Buffers should have more then sufficient memory band-width for effective dual-processor applications. Note also that the arbitration is based on the target resource so that the target resource clock (SysCLK) instead of the processor clock is used. Care should be given that different processor clock rates may affect the arbitration scheme, but it should always work for the maximum performance for the processor with the priority access. Now, the multipath peripheral controller and bus in accordance with the invention will be described in more detail.

Figure 9:
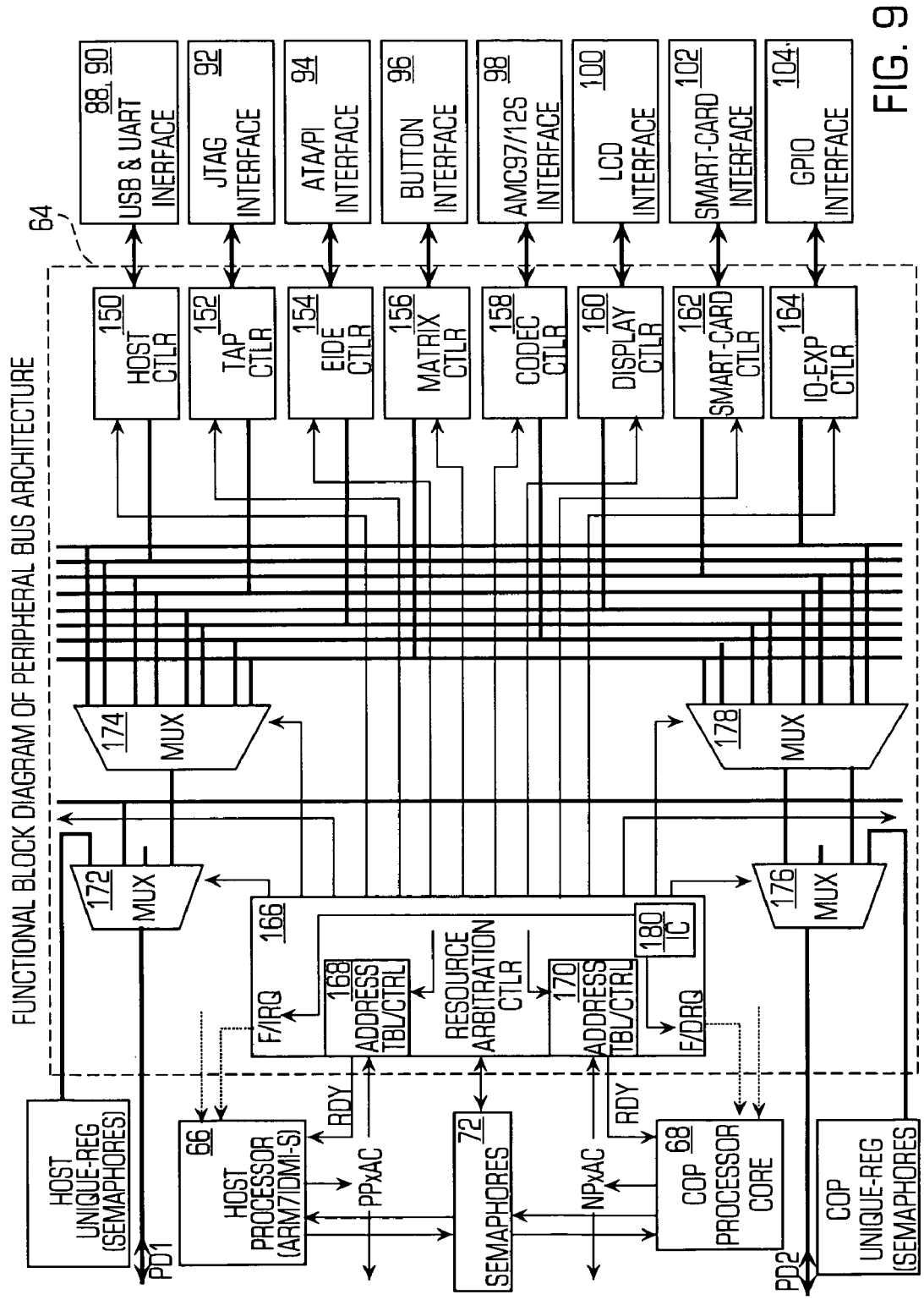
FIG. 9 is a block diagram illustrating more details of the cross bar multipath peripheral bus in accordance with the invention.

FIG. 9 is a block diagram illustrating more details of the cross bar multipath peripheral controller and bus 64 in accordance with the invention wherein other elements of the system are shown as well, such as the host processor 66, the coprocessor 68, the semaphore unit 72 and the one or more peripheral interfaces 88-104 that interface to the one or more peripherals. The multipath peripheral controller 64 may include one or more controllers for the different peripherals such as a host controller 150, a TAP controller 152, a EIDE controller 154, a matrix controller 156, a codec controller 158, a display controller 160, a smart card controller 162 and an IO expansion controller 164 as shown. These controllers are controlled by a resource arbitration controller 166 that control the access of the processors to these shared peripheral resources similar to the access control of the memory resources.

The resource arbitration controller 166, that may be a microcontroller executing one or more pieces of code or microcode to send arbitration commands to the peripherals in a preferred embodiment, may include a first and second address controller 168, 170 that communicate with the address controllers of the resource arbitration controller for the multipath memory controller. As with the memory controller, to select a signal from a peripheral to be provided to each processor, the peripheral controller 64 may include a first multiplexer (MUX) 172, a second MUX 174, a third MUX 176 and a fourth MUX 178. Each MUX is controlled in order to select a signal from one or more signals and output the selected signal as is well known. In this embodiment, the first MUX 172 outputs a signal onto a peripheral data bus (PD1) indirectly to the host processor and the third MUX 176 outputs a signal on another peripheral data bus (PD2) indirectly to the coprocessor. The MUXes indirectly output the signal since those signals are actually fed into MUX 128 and MUX 132 as shown in FIG. 7 and then fed into each processor over the memory data buses (MD1 and MD2 as shown in FIG. 7) assuming the appropriate control signals to the MUXes 128, 132 are provided. Thus, the signal for the particular peripheral is selected by the MUXes 172, 174 and 176, 178, but it is communicated to the processors over the memory data buses due to the MUXes 128, 130.

As with the memory controller, the MUXes 172, 174, 176, 178 are controlled to select a bus containing a signal from a particular peripheral to route that signal to a particular processor. As with the memory controller, the multipath architecture permits each processor to simultaneously access a shared peripheral resources as long as both processors do not need the same shared resource. The operation of the peripheral controller and bus is similar to the memory controller and therefore will not be described herein. However, the timing diagram for the peripheral controller will now be briefly described.

Figure 10:
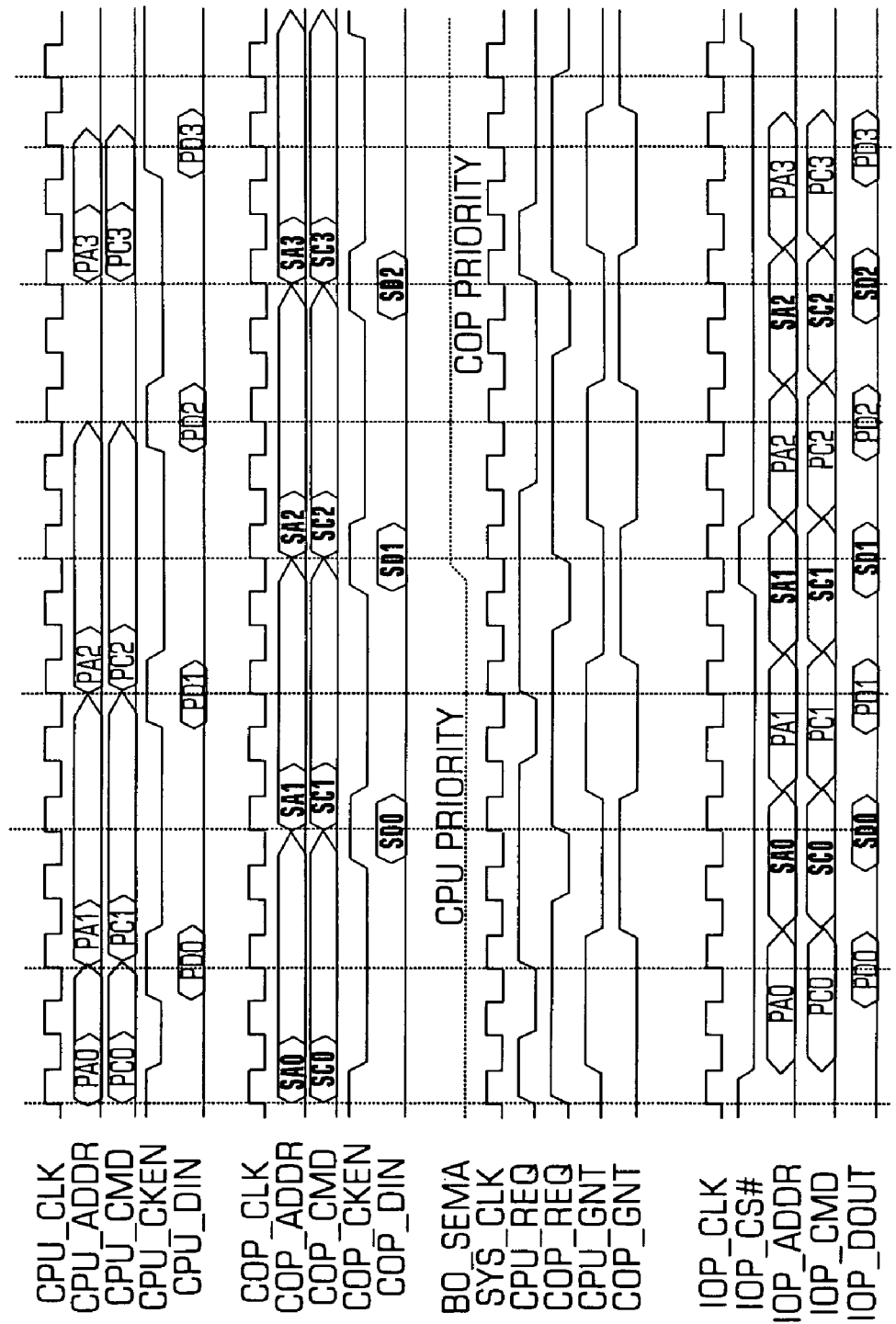
FIG. 10 illustrates the bus access timing of the cross bar multipath peripheral bus of FIG. 9.

FIG. 10 illustrates the bus access timing of the cross bar multipath peripheral bus of FIG. 9. The peripheral bus architecture allows equal access for both processors to all of the peripheral shared resources. Therefore, unlike the memory controller that has priority access to certain memory resources, the host processor 66 and coprocessor 68 have equal access to each resource. The normal mode of arbitration is to give access to a resource to the first processor that requested access to the resource. When both processor request access to the same resource (e.g., for the same peripheral device) a typical round-robin type of fair access arbitration scheme may be utilized although other well known arbitration may also be used. Consequently, due to the equal access of the processors, the peripheral device accesses would always be one-or-more wait bus cycles in contrast to the memory resource controller.

While the foregoing has been with reference to a particular embodiment of the invention, it will be appreciated by those skilled in the art that changes in this embodiment may be made without departing from the principles and spirit of the invention, the scope of which is defined by the appended claims.

The invention claimed is:

1. A system comprising:
   a plurality of memory resources;
   a plurality of peripheral resources;
   a plurality of processors;
   a memory controller coupled to said plurality of processors and said plurality of memory resources, wherein said memory controller comprises a first resource controller operable to control access by said plurality of processors to said plurality of memory resources using a hardware semaphore unit, wherein said first resource controller is further operable to implement respective buses for coupling said plurality of processors to said plurality of memory resources, wherein said memory controller is further operable to enable each processor of said plurality of processors to simultaneously access a respective portion of a memory resource of said plurality of memory resources, and wherein said memory controller is further operable to enable each of said plurality of processors to have priority access to a respective instruction memory of a plurality of instruction memories; and
   a peripheral controller coupled to said plurality of processors and said plurality of peripheral resources, wherein said peripheral controller comprises a second resource controller operable to control access by said plurality of processors to said plurality of peripheral resources using said hardware semaphore unit, and wherein said second resource controller is further operable to implement respective buses for coupling said plurality of processors to said plurality of peripheral resources.

2. The system of claim 1 further comprising:
   a timer component coupled to said memory controller and said peripheral controller, said timer component operable to control timing of said memory controller and said peripheral controller.

3. The system of claim 1, wherein said first resource controller is further operable to enable each of said plurality of processors to simultaneously access a respective memory resource of said plurality of memory resources.

4. The system of claim 1, wherein said second resource controller is further operable to enable each of said plurality of processors to simultaneously access a respective peripheral resource of said plurality of peripheral resources.

5. The system of claim 1, wherein said memory controller and said peripheral controller are further operable to enable each processor of said plurality of processors to perform, in parallel, respective portions of a plurality of tasks.

6. The system of claim 1, wherein said plurality of processors are operable to negotiate for access to at least one shared resource using said hardware semaphore unit, wherein said at least one shared resource is selected from a group consisting of at least one memory resource of said plurality of memory resources and at least one peripheral resource of said plurality of peripheral resources.

7. The system of claim 6, wherein said hardware semaphore unit is further operable to enable said plurality of processors to communicate with one another.

8. The system of claim 6, wherein said access to said at least one shared resource is determined based upon information selected from a group consisting of: a chronological ordering of requests for a shared resource, a round-robin access arbitration scheme; a predetermined priority assignment of a given processor to at least one given shared resource; and a predetermined priority assignment of a given processor to at least one given shared resource for a predetermined period of time.

9. The system of claim 1, wherein said plurality of memory resources, said plurality of peripheral resources, said plurality of processors, said memory controller, and said peripheral controller comprise components of a portable electronic device.

10. A component for negotiating access to a plurality of shared resources, said component comprising:
a memory controller coupled to said plurality of processors and said plurality of memory resources, wherein said memory controller comprises a first resource controller operable to control access by said plurality of processors to said plurality of memory resources using a hardware semaphore unit, wherein said first resource controller is further operable to implement respective buses for coupling said plurality of processors to said plurality of memory resources, wherein said memory controller is further operable to enable each processor of said plurality of processors to simultaneously access a respective portion of a memory resource of said plurality of memory resources, and wherein said memory controller is further operable to enable each of said plurality of processors to have priority access to a respective instruction memory of a plurality of instruction memories; and
a peripheral controller coupled to said plurality of processors and said plurality of peripheral resources, wherein said peripheral controller comprises a second resource controller operable to control access by said plurality of processors to said plurality of peripheral resources using said hardware semaphore unit, and wherein said second resource controller is further operable to implement respective buses for coupling said plurality of processors to said plurality of peripheral resources.

11. The component of claim 10 further comprising:
a timer component coupled to said memory controller and said peripheral controller, said timer component operable to control timing of said memory controller and said peripheral controller.

12. The component of claim 10, wherein said first resource controller is further operable to enable each of said plurality of processors to simultaneously access a respective memory resource of said plurality of memory resources.

13. The component of claim 10, wherein said second resource controller is further operable to enable each of said plurality of processors to simultaneously access a respective peripheral resource of said plurality of peripheral resources.

14. The component of claim 10, wherein said memory controller and said peripheral controller are further operable to enable each processor of said plurality of processors to perform, in parallel, respective portions of a plurality of tasks.

15. The component of claim 10, wherein said plurality of processors are operable to negotiate for access to at least one shared resource using said hardware semaphore unit, wherein said at least one shared resource is selected from a group consisting of at least one memory resource of said plurality of memory resources and at least one peripheral resource of said plurality of peripheral resources.

16. The component of claim 15, wherein said hardware semaphore unit is further operable to enable said plurality of processors to communicate with one another.

17. The component of claim 15, wherein said access to said at least one shared resource is determined based upon information selected from a group consisting of: a chronological ordering of requests for a shared resource; a round-robin access arbitration scheme; a predetermined priority assignment of a given processor to at least one given shared resource; and a predetermined priority assignment of a given processor to at least one given shared resource for a predetermined period of time.

18. The component of claim 10, wherein said plurality of processors, said memory controller, and said peripheral controller comprise components of a portable electronic device.

19. A controller for negotiating access to a plurality of shared resources, said controller comprising:
a resource arbitration controller operable to control access by said plurality of processors to said plurality of shared resources using a hardware semaphore unit, wherein said resource arbitration controller is further operable to implement respective buses for coupling said plurality of processors to said plurality of shared resources, wherein said resource arbitration controller is further operable to enable each processor of said plurality of processors to simultaneously access a respective portion of a shared resource of said plurality of shared resources, and wherein said resource arbitration controller is further operable to enable each of said plurality of processors to have priority access to a respective instruction memory of a plurality of instruction memories.

20. The controller of claim 19, wherein said resource arbitration controller is further operable to control access of said plurality of processors to said plurality of shared resources based upon a respective priority value assigned to each of said plurality of processors.

21. The controller of claim 20, wherein said respective priority value is assigned to each of said plurality of processors using a hardware semaphore unit.

22. The controller of claim 19, wherein said plurality of shared resources are selected from a group consisting of at least one memory resource and at least one peripheral resource.

23. The controller of claim 19, wherein said resource arbitration controller is further operable to enable each of said plurality of processors to simultaneously access a respective shared resource of said plurality of shared resources.

24. The controller of claim 19, wherein said resource arbitration controller is further operable to enable each processor of said plurality of processors to perform, in parallel, respective portions of a plurality of tasks.

* * * * *